United States Patent
Tiemann et al.

(12) 
(10) Patent No.: US 6,291,900 B1
(45) Date of Patent: Sep. 18, 2001

(54) ELECTRICAL ENERGY MANAGEMENT FOR MANUALLY POWERED DEVICES

(75) Inventors: Jerome Johnson Tiemann, Schenectady; John Eric Tkaczyk, Delanson, both of NY (US); Wolfgang Daum, Louisville, KY (US); Lionel Monty Levinson, Niskayuna; Elihu Calvin Jerabek, Glenmont, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/483,026

(22) Filed: Jan. 13, 2000

Related U.S. Application Data

(63) Continuation of application No. 08/932,086, filed on Sep. 15, 1997, now abandoned.

(51) Int. Cl.$^7$ ........................................................ H02P 9/04
(52) U.S. Cl. ................................ 290/1 A; 290/1 E; 322/1
(58) Field of Search ................................. 290/1 R, 1 A, 290/1 C, 1 E; 322/1, 2 R, 25, 28

(56) References Cited

U.S. PATENT DOCUMENTS

| | | |
|---|---|---|
| 1,015,298 | 1/1912 | Cleland . |
| 1,366,461 | 1/1921 | Johnson . |
| 1,368,700 | 2/1921 | Conkling . |
| 1,942,505 | 1/1934 | Beck ........................................ 185/39 |
| 2,247,901 | 7/1941 | Alexander ........................... 240/10.5 |
| 2,322,067 | 6/1943 | Soreny ..................................... 67/29 |

(List continued on next page.)

FOREIGN PATENT DOCUMENTS

| | | |
|---|---|---|
| 9516144 | 8/1995 | (EP) . |

OTHER PUBLICATIONS

Robot Evolution The Development of Anthrobotics, by Mark E. Rosheim.
Robots The Quest for Living Machines.
Wall Street Journal (European Edition) Article, "Low–Technology Radio Cranks Out Tunes," by Kimberley A. Strassel, Jul. 4, 1997.

Primary Examiner—Nicholas Ponomarenko
(74) Attorney, Agent, or Firm—John F. Thompson; Jill M. Breedlove

(57) ABSTRACT

A manually powered apparatus includes a mechanical energy input device that releases mechanical energy. The mechanical energy input device has first and second mechanical energy delivery cycles. A generator is mechanically coupled to the mechanical energy input device. The generator converts released mechanical energy to electrical energy. The electrical energy includes first current levels and second current levels that decrease over time. The generator supplies the first current levels in response to the first mechanical energy delivery cycle. The second current levels are supplied in response to the second mechanical energy delivery cycle. A load is connected to the generator. The load requires a predetermined current for operation. The first current level is greater than the predetermined current, and the second current level is less than the predetermined current. An electrical energy storage device is connected between the generator and the load. The electrical energy storage device is charged during the first mechanical energy delivery cycle, and the electrical energy storage device is discharged during the second mechanical energy delivery cycle. An isolator is connected between the electrical energy storage device and the load. The isolator minimizes reverse current flow from the electrical energy storage device to the generator. A disconnector is electrically connected between the electrical energy storage device and the load. The disconnector decouples the load from the electrical energy storage device to prevent the electrical energy storage device from completely discharging.

37 Claims, 14 Drawing Sheets

U.S. PATENT DOCUMENTS

| | | | |
|---|---|---|---|
| 2,390,877 | 12/1945 | Fisher | 171/209 |
| 2,393,209 | 1/1946 | Weil | 240/10.5 |
| 2,424,700 | 7/1947 | McMath | 240/10.5 |
| 2,488,021 | 11/1949 | May | 171/209 |
| 2,524,005 | 9/1950 | Boe | 290/1 |
| 2,535,041 | 12/1950 | Clark | 171/76 |
| 3,056,957 | 10/1962 | Carlson | 340/384 |
| 3,099,402 | 7/1963 | Speck | 240/10.66 |
| 3,211,069 | 10/1965 | Rixton | 95/11.5 |
| 3,354,383 | 11/1967 | Weismann | 322/29 |
| 3,675,113 | 7/1972 | Bader et al. | 322/28 |
| 3,735,412 | 5/1973 | Kampmeyer | 343/225 |
| 3,751,710 | 8/1973 | Carmichael et al. | 315/79 |
| 3,792,307 | 2/1974 | Baker | 315/77 |
| 3,794,852 | 2/1974 | Willis | 325/185 |
| 3,800,212 | 3/1974 | Branco et al. | 322/28 |
| 4,069,451 | 1/1978 | Rouse | 322/1 |
| 4,081,738 | 3/1978 | Roller | 320/7 |
| 4,088,882 | 5/1978 | Lewis | 362/217 |
| 4,158,158 | 6/1979 | Burkett | 318/139 |
| 4,169,992 | 10/1979 | Nash | 322/29 |
| 4,200,374 | 4/1980 | Shimizu et al. | 354/60 R |
| 4,227,092 | 10/1980 | Campagnuolo | 290/1 C |
| 4,287,428 | 9/1981 | Smith | 290/1 E |
| 4,297,629 | 10/1981 | Godard et al. | 320/7 |
| 4,315,301 | 2/1982 | Jimena | 362/193 |
| 4,332,006 | 5/1982 | Choe | 362/193 |
| 4,360,860 | 11/1982 | Johnson et al. | 362/192 |
| 4,375,593 | 3/1983 | Winterbotham | 307/37 |
| 4,399,397 | 8/1983 | Kleinschmidt, Jr. | 322/8 |
| 4,410,930 | 10/1983 | Yachabach | 362/145 |
| 4,523,261 | 6/1985 | West | 362/192 |
| 4,539,497 | 9/1985 | Boyer | 310/75 R |
| 4,555,656 | 11/1985 | Ryan | 320/5 |
| 4,636,670 | 1/1987 | Kallstrom | 310/67 A |
| 4,657,289 | 4/1987 | Boyer | 290/1 R |
| 4,676,763 | 6/1987 | Saito et al. | 446/230 |
| 4,687,891 | 8/1987 | Bartolo et al. | 200/153 |
| 4,713,637 | 12/1987 | Maier et al. | 335/76 |
| 4,719,992 | 1/1988 | Elward et al. | 185/43 |
| 4,750,295 | 6/1988 | Court et al. | 49/340 |
| 4,761,577 | 8/1988 | Thomas et al. | 310/67 A |
| 4,799,003 | 1/1989 | Tu et al. | 322/29 |
| 4,837,494 | 6/1989 | Maier et al. | 322/1 |
| 4,931,717 | 6/1990 | Gray et al. | 323/299 |
| 5,027,035 | 6/1991 | McGrail et al. | 315/119 |
| 5,121,046 | 6/1992 | McCullough | 320/16 |
| 5,188,003 | 2/1993 | Trammell, Jr. | 74/594.3 |
| 5,388,847 | 2/1995 | Trammell, Jr. | 280/215 |
| 5,539,708 | 7/1996 | Guignard | 368/140 |
| 5,552,973 | 9/1996 | Hsu | 362/192 |
| 5,584,561 | 12/1996 | Lahos | 362/72 |
| 5,590,946 | 1/1997 | Jung | 362/72 |
| 5,637,984 | 6/1997 | Chu | 322/8 |
| 5,880,532 * | 3/1999 | Stopher | 290/1 E |
| 5,917,310 * | 6/1999 | Baylis | 322/1 |
| 6,133,642 * | 10/2000 | Hutchinson | 290/1 A |

\* cited by examiner

US 6,291,900 B1

ELECTRICAL ENERGY MANAGEMENT FOR MANUALLY POWERED DEVICES

CROSS REFERENCE TO RELATED APPLICATIONS

This application is a continuation of application U.S. Ser. No. 08/932,086 filed on Sep. 15, 1997 now abandoned.

BACKGROUND OF THE INVENTION

The present invention relates to manually powered devices. More specifically, the present invention relates to the effective generation, conversion and utilization of electrical energy generated by manually powered mechanisms.

Portable electronic devices, radios, lights, toys, electronic remote controls and/or wireless electronic remote controls, can be powered by portable power sources, such as batteries which store chemical energy, springs which store mechanical energy or by input of manual energy directly converted to electricity. Batteries convert the stored chemical energy into electrical energy when under load. Stored mechanical energy and direct mechanical energy are converted into electrical energy by a generator, commonly characterized by the use of a DC motor with coils on the rotor and ferrite permanent magnets on the stator. Such devices have the advantage of being portable, usable in remote locations, and are not dependent on connection to an external power source.

When a spring system wound by manual input of energy is used as the sole energy source in a portable device, the maximum play time is limited to the time the spring is unwinding. The spring must be rewound to continue use of the device.

Spring storage power systems typically used in personally powered devices waste some of the energy stored in the spring. Present power systems provide a constant voltage, which wastes power at low power usage levels and causes clipping at high power usage levels. The power system dumps the excess energy whenever the output current of the generator exceeds the instantaneous need of the device, thereby not making use of some of the energy stored in the spring.

In a typical application of a spring motor, it is convenient to release the spring tension at a constant angular rate. When the spring is coupled to a generator with fixed gear ratio, a constant angular rate of unwind corresponds to constant voltage output of the generator. However, the output torque of a two-spool spring motor is not constant but decreases as the spring unwinds. As a result the power output, which equals torque multiplied by angular frequency, is not constant. In the case where the spring motor is connected to an electrical generator to run some electric device, it is undesirable to provide diminishing power. As the electrical load typically requires a minimum power level to operate, the spring motor has to be oversized so that the last turns of the spring wound motor provide the minimum torque required. At all other times the excess torque leads to excess power which is not used by the electrical apparatus.

BRIEF SUMMARY OF THE INVENTION

One exemplary embodiment of present invention includes a manually powered apparatus for converting mechanical energy to electrical energy. The manually powered apparatus provides a crank. A spring drive is mechanically coupled to the crank. The spring drive has the capability of releasing mechanical energy, and the spring drive has first and second unwind cycles.

An electrical generator is mechanically coupled to the spring drive. The electrical generator converts released mechanical energy into electrical energy. The electrical energy includes at least first current levels and second current levels. The first and second current levels decrease over time. The electrical generator supplies the first current levels in response to the first unwind cycle of the spring drive, and the second current levels are supplied by the electrical generator in response to the second unwind cycle of the spring drive.

An electrical load is electrically coupled to the electrical generator. The electrical load requires a predetermined current for operation. The first current levels are greater than the predetermined current, and the second current levels are less than the predetermined current. A battery buffer is electrically coupled between the electrical generator and the electrical load. The battery buffer is charged during the first unwind cycle of the spring drive and the battery buffer is discharged during the second unwind cycle of the spring drive.

An isolator is electrically coupled between the battery buffer and the generator. The isolator minimizes the reverse current flow from the battery buffer to the electrical generator. A disconnector is mechanically coupled to the spring drive, and the disconnector is electrically coupled between the load and the battery buffer. The disconnector decouples the load from the battery buffer when the spring drive has completely unwound.

DETAILED DESCRIPTION OF THE INVENTION

Figure 1:
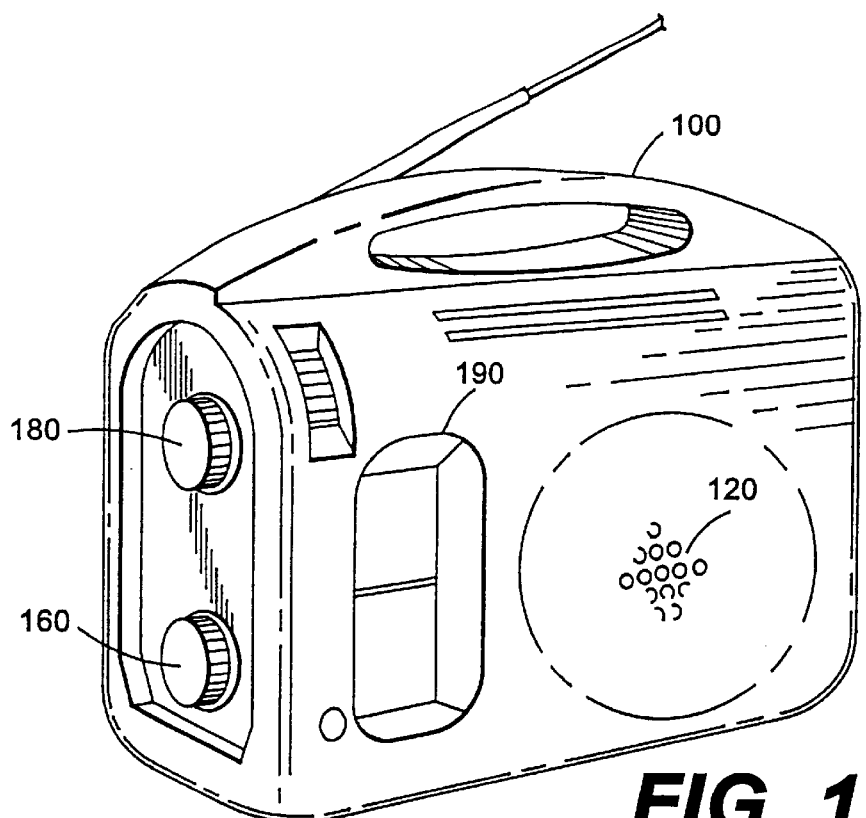
FIG. 1 is a front view of a highly simplified manually powered apparatus used in one exemplary embodiment of the present invention.
Figure 2:
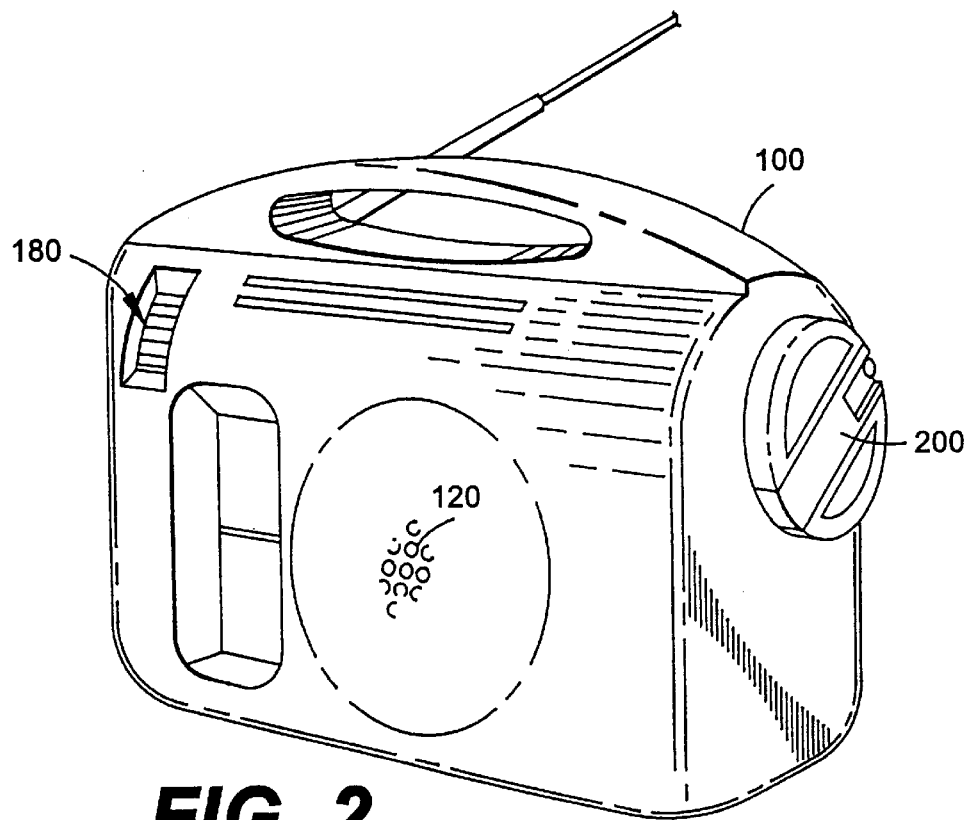
FIG. 2 is another front view of a highly simplified manually powered apparatus used in one exemplary embodiment of the present invention.

In FIGS. 1 and 2, one embodiment of the manually powered apparatus comprises a radio. It should be appreciated that the radio shown in FIGS. 1 and 2 is one exemplary embodiment, and the present invention should not be limited to the one embodiment shown. Other embodiments can include, for example, toys, lights, electronic remote control devices, wireless electronic remote control devices and other electronic devices.

In this embodiment shown in FIGS. 1 and 2, the manually powered apparatus 100 includes a crank 200 for inputting mechanical energy. The manually powered apparatus 100 also includes a speaker 120, volume control 160, a tuner 180 and a frequency display 190. It should be appreciated that the components are specific to the embodiment shown and will differ according to the type of manually powered apparatus 100 that is used in other embodiments. Therefore, the present invention should not be limited by the components shown in FIGS. 1 and 2.

Figure 3:
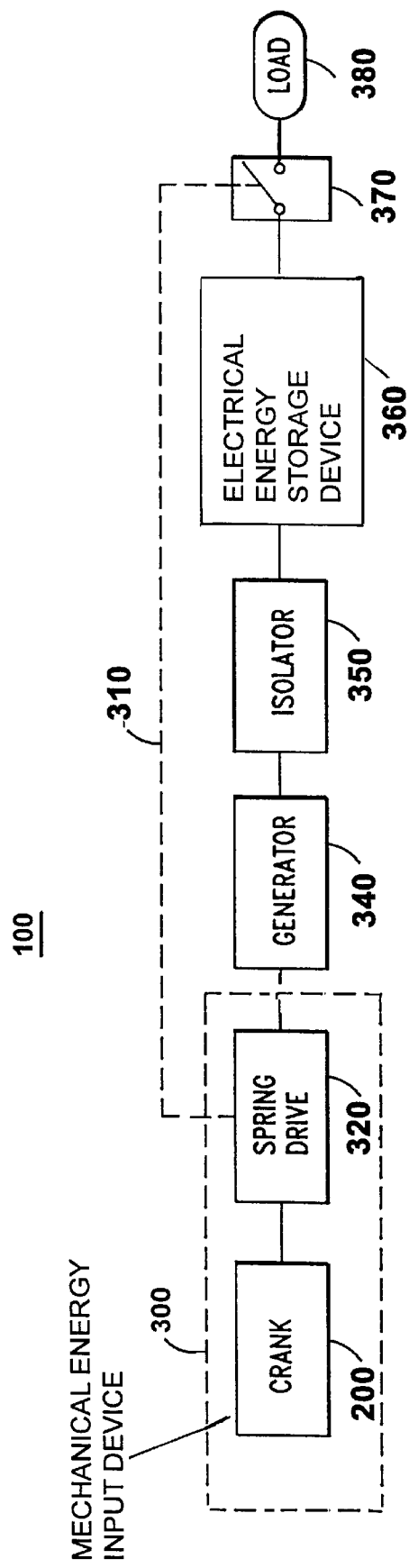
FIG. 3 is a block diagram illustrating one embodiment of the manually powered apparatus.

As shown in FIG. 3, one embodiment of the manually powered apparatus 100 includes a mechanical energy input device 300. In this embodiment, the mechanical energy input device 300 comprises a crank 200 and a spring drive 320. It should be appreciated that the mechanical energy input device 300 should not be limited to the components shown in FIG. 3. Other mechanisms used for the input of mechanical energy can also be used with the present invention and other examples will be described herein below.

The mechanical energy input device 300 is connected to a generator 340. As explained above, the load 380 can include a variety of electronic or electrical devices. An isolator 350 is connected between the generator 340 and the load 380. An electrical energy storage device 360 is connected between the isolator 350 and the load 380. In one embodiment, a disconnector 370 is mechanically coupled via a mechanical linkage 310 to the spring drive 320, and the disconnector 370 is electrically connected between the load 380 and the electrical energy storage device 360. In another embodiment, the disconnector 370 is electrically coupled between the load 380 and the electrical energy storage device 360 and prevents the electrical energy storage device 360 from completely discharging.

The mechanical energy input device 300 releases mechanical energy at first and second mechanical energy delivery cycles. The first and second mechanical energy delivery cycles are produced when the spring drive 320 is wound using the crank 200. The first mechanical energy delivery cycle is produced from a first torque produced by the spring drive 320 after the spring drive 320 is wound by crank 200. The spring drive 320 is not required to be completely wound to produce the first torque, and the amount of winding is proportional to the torque produced by the spring drive 320. The torque produced by the spring drive 320 decreases as the spring drive 320 unwinds. Therefore, the mechanical energy supplied to the generator 340 decreases as the spring drive 320 unwinds. As such, the first and second current level will decrease as the spring drive 320 unwinds. It is desirable that a low voltage be presented to the generator 340 while the spring drive 320 unwinds. In one embodiment, a voltage substantially equal to the voltage of the electrical energy storage device 360 is presented to the generator 340 while the spring drive 320 unwinds.

Corresponding to the first torque, the first mechanical energy delivery cycle supplies mechanical energy to the generator 340 which correspondingly produces a first current level in response to the first mechanical energy delivery cycle. The first current level may be higher than a current level required by the load 380 for operation. Therefore, an excess current level may be available during the first mechanical energy delivery cycle. So as to not waste the excess current level produced by the generator 340 during the first mechanical energy delivery cycle, the excess current level is stored as electrical energy in electrical energy storage device 360. As such, the present invention does not waste the excess current level that is produced during the first mechanical energy delivery cycle. Since the torque produced by the spring drive 320 decreases as the spring drive 320 unwinds, the electrical energy that is available to be stored in the electrical energy storage device 360 decreases as the spring drive 320 unwinds, and the excess current level also decreases as the spring drive 320 unwinds.

After the spring drive 320 has released a predetermined amount of mechanical energy, the spring drive 320 produces a second torque that is less than the first torque. Corresponding to the second torque, the generator 340 produces a second current level that is less than the current level required by the load 380 for operation.

During the second mechanical energy delivery cycle, the electrical energy storage device 360 supplies a current level that makes up the deficiency between the second current level produced by the generator 340 and the current level that is required by the load 380. The torque from the spring drive 320 is converted to electrical energy by the generator 340. During the second mechanical energy delivery time, the electrical energy produced by the generator 340 as a result of the torque supplied by the spring drive 320 is combined with the electrical energy produced by the electrical energy storage device 360. As such, additional electrical energy from the electrical energy storage device 360 is provided in response to the lower torque produced by the spring drive 320 that produces a lower electrical energy from the generator 340. Therefore, additional run time is provided after the spring drive 320 does not produce enough torque to power the load 380 because the electrical energy produced by the generator 340 in response to the torque from the spring drive 320 and electrical energy produced by the electrical energy storage device are combined. In addition, the manually powered apparatus 100 has a longer run time than conventional manually powered devices. It should be appreciated that since a decreasing amount of electrical energy is produced as the spring drive 320 unwinds, the electrical energy storage device 360 provides an increasing current level as the spring drive 320 unwinds during the second mechanical energy delivery cycle.

An isolator 350 is included that prevents the electrical energy storage device 360 from driving the generator 340 backwards as a motor. The isolator 350 is connected between the electrical energy storage device 360 and the generator 350. In addition, the isolator 350 aids in the effective utilization of the additional stored electrical energy by electronically isolating electrical energy storage device 360 and load 380 from generator 340.

The disconnector 370 is electrically connected between the load 380 and the electrical energy storage device 360, and is used to disconnect the load 380 from the electrical energy storage device 360. In one embodiment when the load 380 is disconnected from the electrical energy storage device 360, the generator 340 charges the electrical energy storage device 360. In this embodiment, if spring drive 320 is wound and unwound while the load 380 is disconnected from the electrical energy storage device 360, the electrical energy produced by the generator 340 is stored in the electrical energy storage device 360.

In another embodiment, the disconnector 370 prevents a potential problem that can exist with the use of the electrical energy storage device 360. This potential problem exists particularly when the electrical energy storage device 360 comprises a battery. In this embodiment, the electrical energy storage device 360 is damaged when the electrical energy storage device 360 is left coupled to load 380 after the mechanical energy in spring drive 320 has been exhausted. Although certain loads, such as a radio, inherently act as voltage limiting device because of the circuit arrangement, others, such as simple resistive loads, can drain the electrical energy storage device 360 to a very low charge if the electrical energy storage device 360 is kept coupled to the load 380 after the spring drive 320 unwinds. Complete discharge of electrical energy storage device 360, especially in the case of a battery, necessitates generation of sufficient energy during the next charge cycle to raise the battery voltage to a range appropriate for proper operation of load 380.

In order to prevent complete discharge of the electrical energy storage device 360, the manually powered apparatus 100 uses the disconnector 370 to prevent the electrical energy storage device 360 from becoming fully discharged by the load 380. In this embodiment, the disconnector 370 is mechanically coupled to the spring drive 320 via mechanical linkage 310. When the spring drive 320 is fully unwound, the mechanical linkage 310 activates the disconnector 370 and decouples the load 380 from the electrical energy storage device 360. As such, the disconnector 370 via the mechanical linkage 310 prevents the electrical energy storage device 360 from being connected to the load 380 when the spring drive 320 is completely unwound. This disconnection prevents the electrical energy storage device 360 from becoming fully discharged by the load 380, and the disconnection prevents damage to the electrical energy storage device 360 that can arise if the electrical energy storage device 360 is allowed to be completely discharged.

As shown in FIGS. 1–3, one embodiment of the mechanical energy input device 300 comprises a crank 200 that is connected to a spring drive 320. The crank 200 is manually wound to produce a resultant torque in the spring drive 320. The spring drive 320 is mechanically connected to the generator 340 via, for example, a gear ratio (not shown). Due to the nature of the spring drive 320, the torque steadily decreases as the spring drive 320 unwinds. As a result, the current level produced by the generator 340 from the torque also reduces as the spring drive 320 unwinds.

The generator 340 can be operated in a power regime to obtain greater efficiency that is not limited to the specific power requirements of load 380. By reducing the gear ratio between spring device 320 and generator 340, generator 12 operates at a greater torque, fewer revolutions, and correspondingly higher output current. Typically, in a generator 340 there is a loss of energy for each rotation of the generator 340 due to friction and magnetic hysteresis. The efficiency of most generators 340 can be improved when the total number of rotations of the armature within the generator 340 is reduced. In a preferred embodiment, the reduction in the gear ratio between spring drive 320 and generator 340 will result in fewer rotations of the generator armature. This improved efficiency enables a greater amount of energy (out of the total energy input to spring drive 320) to be converted to electrical current, thereby providing an increased operational duration of load 380.

Figure 5:
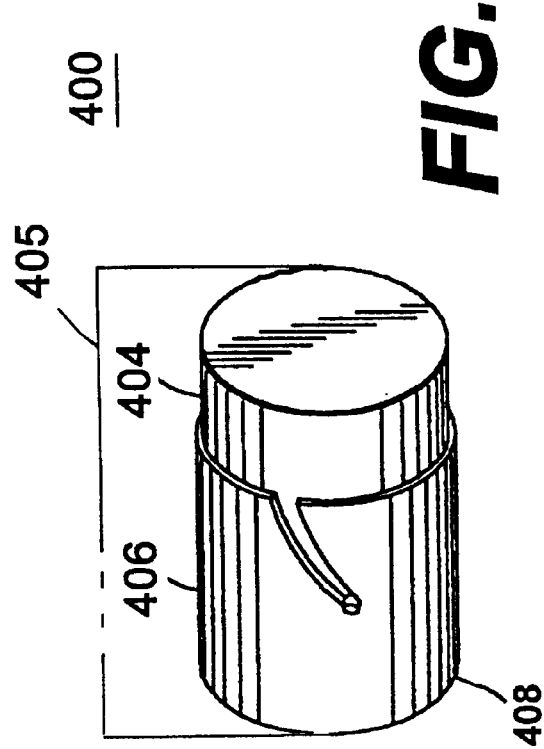
FIG. 5 is another perspective views of a ratchet crank embodiment.
Figure 6:
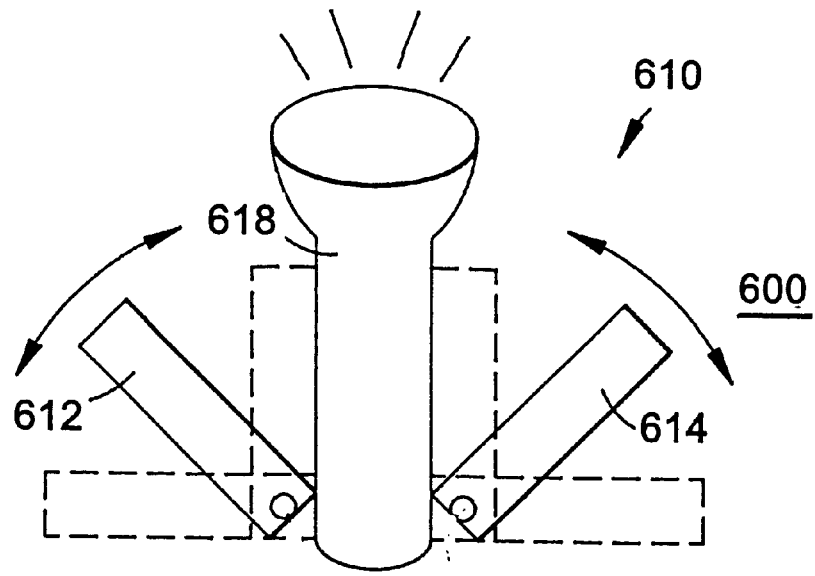
FIG. 6 is a side view of a foot crank embodiment.
Figure 7:
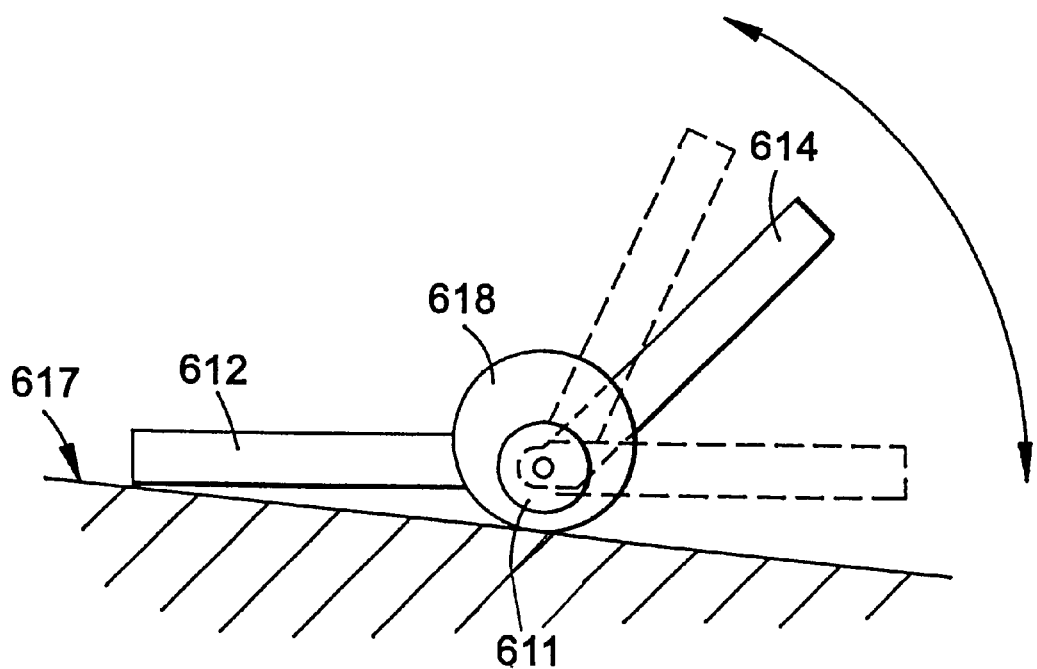
FIG. 7 is an end view of a foot crank embodiment.

As shown in FIGS. 4–7, another embodiment of the mechanical energy input device 300 is provided to capture simple reciprocal action as embodied in a ratchet crank 400 (FIGS. 4 and 5) and a foot crank 600 (FIGS. 6 and 7). The input of manual energy from the user's foot instead of the hand allows for greater input of energy with less apparent effort. Typically, foot operation is less intrusive than requiring manual operation through hand cranking. The energy may be input during a common activity, such as walking, without obvious effort by the user. Such a mechanical input device captures otherwise dissipated energy. However, feet and legs are not as agile as hands and arms and cannot conveniently operate devices such as a crank 200.

Figure 4:
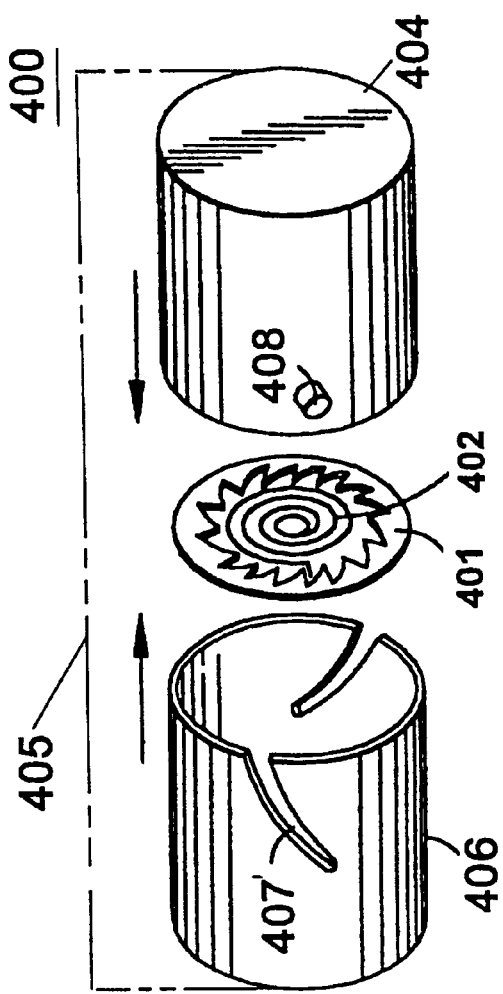
FIG. 4 is a perspective view of a ratchet crank embodiment.

In FIGS. 4 and 5, a ratchet crank 400 operates to store translational energy generated when a foot or hand compresses two housing halves 404 and 406 together. As shown in FIG. 4, ratchet 403 is coupled to concentric spring 402 such that the concentric spring 402 is wound each time ratchet 403 is advanced. The ratchet 403 is advanced each time a housing 405, shown in FIG. 5, is compressed. The housing 405 comprises the two housing halves 404 and 406 coupled together with a pin 408 in a spiral groove 407. The groove 407 and pin 408 cause the two housing halves 404 and 406 to rotate each time the housing 405 is compressed. The ratchet 403 is secured to housing half 404, and the concentric spring 402 is secured to housing hall 406. The rotation of the two housing halves 404 and 406 winds the concentric spring 402. A return spring (not shown) is also included in housing 405 to bias the two housing halves 404 and 406 apart so that the two housing halves 404 and 406 are compressed to wind concentric spring 402. The ratchet 403 can advance one or more click every time the ratchet crank 400 is compressed.

In one embodiment, the ratchet crank 400 is compressed by stepping on one end of the two housing halves 404 or 406. In this embodiment, the ratchet crank 400 can be attached to or inserted inside the heel or sole of a shoe. The ratchet crank 400 is compressed while walking thus winding concentric spring 402. When concentric spring 402 is wound, ratchet crank 400 is removed from the shoe and inserted into a manually powered apparatus 100, for example, as shown in FIGS. 1–3. The concentric spring 402 then unwinds, and the mechanical energy in the concentric spring 402 can be used to generate electrical energy to be utilized by a manually operated apparatus 100.

In another embodiment, manual energy that is input from the feet and legs is utilized. In FIGS. 6 and 7, a foot crank 600 is used to operate a flashlight 610. It should be appreciated that the flashlight 610 is one embodiment, and the present invention should not be limited to the embodiment shown in FIGS. 6 and 7. A flashlight 610, as illustrated in FIGS. 6 and 7, is provided with a first lever 612 and a second lever 614. The first and second levers 612 and 614, respectively, fold flush with a body 618 of the flashlight 610 when the first and second levers 612 and 614, respectively, are not operated. The first and second levers 612 and 614, respectively, can be used to power the flashlight 610 using electronics as shown in FIG. 3. As shown in FIGS. 6 and 7, the flashlight 610 can be oriented vertically (FIG. 6) or horizontally (FIG. 7) during operation. In one embodiment, an operator can use feet or hands to operate first and second levers 612 and 614, respectively.

As shown in FIG. 6, the first and second levers 612 and 614, respectively, fold out from a hinge 616 that is attached to one end of flashlight body 618. The first and second levers 612 and 614 extend from a retracted position against flashlight body 618 to a fully extended position, generally perpendicular to flashlight body 618. Once the first and second levers 612 and 614 are in the extended position, the flashlight 610 is placed on its side, as shown in FIG. 7. In FIG. 7, the end view of flashlight body 618 is shown resting on a firm surface 617. A gear 611 inside flashlight 610 converts the relative motion of the first and second levers 612 and 614 to rotational energy which is utilized to power generator 340 (FIG. 3). The first lever 612 is held against surface 617 while the second lever 614 is reciprocated to operate generator gear 611. The moveable second lever 614 is connected to a gear motor shaft (not shown) through a ratchet (not shown). In addition, the second lever 614 is provided with a spring return (not shown) so that after the second lever 614 is pushed toward surface 617, the second lever 614 returns to a cocked position away from surface 617. The first lever 612 is connected to the gear 611 of flashlight body 618. Gear 611 turns at high speed so that the generator 340 can generate electrical energy.

The mechanisms for generating mechanical energy, shown in FIGS. 4–7, can be applied to toys, such as dolls, bicycles, tricycles or cars. In this manner, torque exerted on the parts of the toy during normal use is used to generate electricity needed to operate various mechanisms or electronics. Therefore, the enjoyment of the toy is increased without increasing the work necessary to produce the electrical energy. For example, the legs on a doll can be used as first and second levers 612 and 614 such that as the legs are moved in a normal walking motion, mechanical energy is generated via the mechanisms discussed herein above. Also, the arms of a doll can be used to generated mechanical energy by, for example, moving the arms as though the doll is waving, swinging the doll arms, or clapping the doll hands. In addition, the head of the doll may be turned from side to side or up and down while the doll body is held stationary to generate mechanical energy. In another embodiment, the wheels of a toy car, bicycle or tricycle can be used to generate mechanical energy used to generate electrical energy to operate various mechanisms or electronics.

In further embodiments, mechanical energy is converted to electrical energy at the time of input and stored as electrical energy rather than mechanical energy, thereby, eliminating of the spring drive 320. The elimination of spring drive 320 provides enhanced energy efficiency because the energy lost (typically about 50%) during the conversion of mechanical to electrical energy is eliminated.

As shown in FIG. 3, the generator 340 is connected to the mechanical energy input device 300. The generator 340 generates electrical energy from the mechanical energy that is input from the mechanical energy input device 300. A gear ratio (not shown) mechanically connects the generator 340 to the mechanical energy input device 300. In a preferred embodiment, the generator provides a positive and a negative terminal (not shown) that provide electrical energy in the form of voltage and current to the load 380. It should be appreciated that the electrical energy can be provided from the generator via a variety of contacts or electrical connections known in the art, and as such, the present invention should not be limited to those embodiments disclosed herein.

In FIG. 3, the electrical energy storage device 360 is connected between the load 380 and the isolator 350. In one embodiment, the electrical energy storage device 360 comprises a battery or a battery buffer. In a preferred embodiment, the battery is rechargeable. In another preferred embodiment, the rechargeable battery comprises a nickel-cadmium (Ni—Cd) rechargeable battery. It should be appreciated that the present invention encompasses any type of electrical energy storage device 360 comprises, for example, batteries, rechargeable batteries and capacitors. It should also be appreciated that the electrical energy storage device 360 can comprise series or parallel configurations of these elements such that electrical energy can be stored and discharged as disclosed herein.

Figure 8:
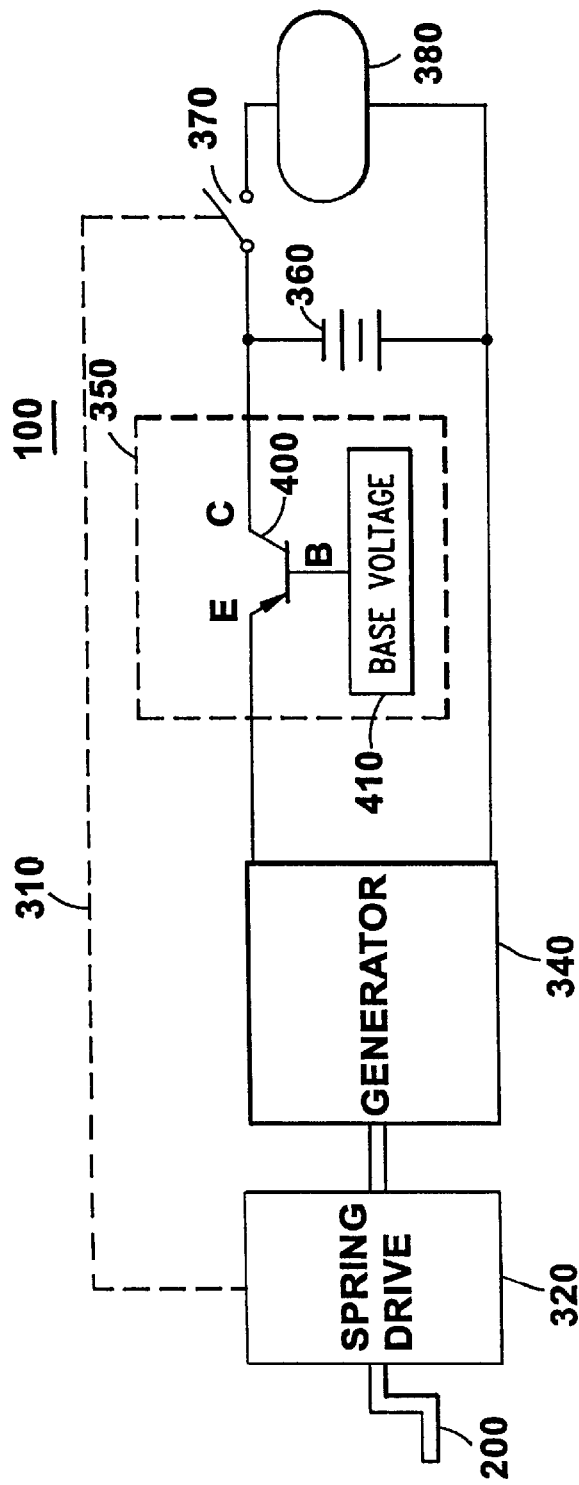
FIG. 8 is a block diagram of one exemplary embodiment of the present invention including an isolator comprising a transistor.
Figure 9:
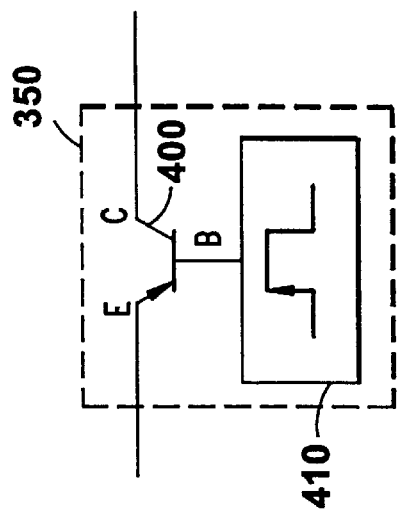
FIG. 9 is a schematic diagram of one exemplary embodiment of the isolator of FIG. 8.
Figure 10:
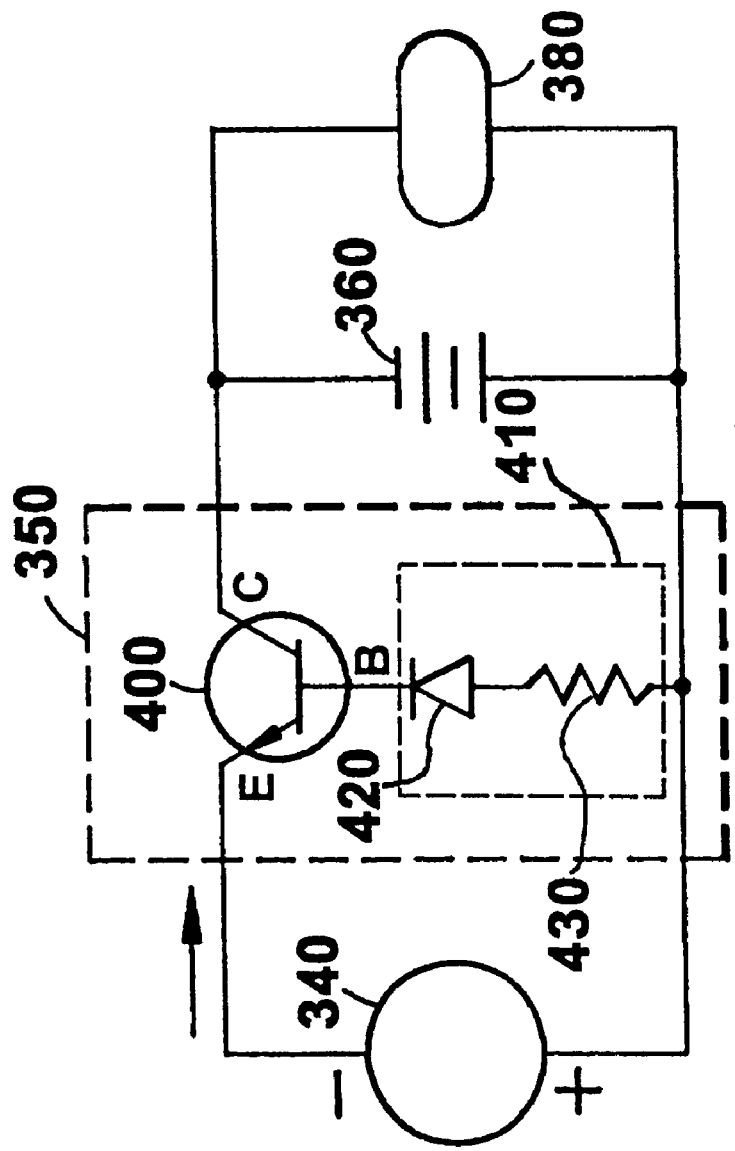
FIG. 10 is another schematic diagram of one exemplary embodiment of the present invention including an isolator comprising a transistor.

As shown in FIG. 3, the isolator 350 is coupled between generator 340 and electrical energy storage device 360 to prevent electrical energy from the electrical energy storage device 360 from being used to drive generator 350 as a motor. In one embodiment, as shown in FIGS. 8–10, isolator 350 comprises an electrical circuit including a transistor 400 and a base voltage circuit 410. As shown in FIG. 10, the base voltage circuit 410 may comprise, for example, a resistor 420, and a diode 430. In one embodiment, the transistor 100 comprises an NPN transistor. In this embodiment, the emitter (E) is coupled to the negative terminal (not shown) of the generator 340. The collector (C) is connected to the load 380 through the electrical energy storage device 360 and the disconnector 370. It should be appreciated that, although the isolator 350 is shown in FIGS. 8–10 comprising an NPN transistor 400, the present invention encompasses other types of transistors 400 such as a PNP transistor.

At a given current level (referred to herein as a "blocking current") drawn from generator 340 by the load 380, a restraining torque equivalent to the driving torque from spring drive 320 can be developed. Transistor 400 is typically sized such that emitter (E) voltage rises to the point corresponding to the blocking current. At this voltage, sufficient base (B) current flows to saturate transistor 400. At saturation, a very low emitter-collector (E-C) voltage drop exists. Typically, the voltage drop across transistor 400 is less than about 0.1 volt. The diode 430 and resistor 420 are coupled together and sized to provide the desired base voltage 410 and corresponding base current to saturate transistor 400 at current levels from the generator 340 that are above the blocking current.

When load 380 is being supplied power from the electrical energy storage device 360, transistor 400 is in a reverse biased mode. In the reverse bias mode, the current transfer ratio is much smaller than the current transfer ratio in the forward biased mode. The current transfer ratio described herein is the ratio of collector current to emitter current, hereinafter called alpha. Alpha is typically about 0.99 when transistor 400 is forward biased. Under such conditions, considerably more base current is required to produce emitter current. Also, the resistor 610 creates an additional voltage drop. This combined voltage drop effectively cuts off transistor 400, and as a result, during reverse bias mode a very small reverse current flow from the electrical energy storage device 360 to generator 340. In a preferred embodiment, the reverse bias current of the transistor 400 is at least two orders of magnitude lower than the collector current, and the collector current is substantially equal to the emitter current.

Figure 11:
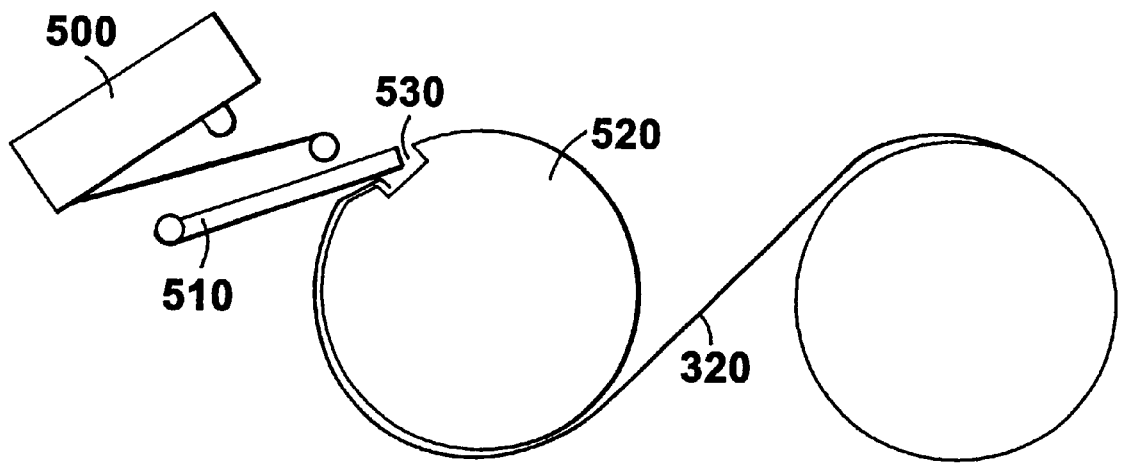
FIG. 11 is a side view of a first position of a disconnector used in one exemplary embodiment of the present invention.
Figure 12:
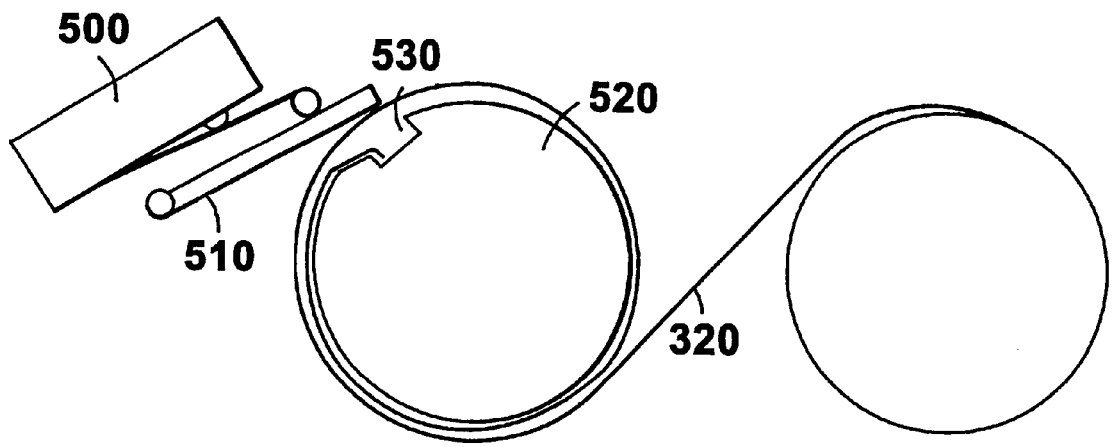
FIG. 12 is a side view of a second position of a disconnector used in one exemplary embodiment of the present invention.
Figure 13:
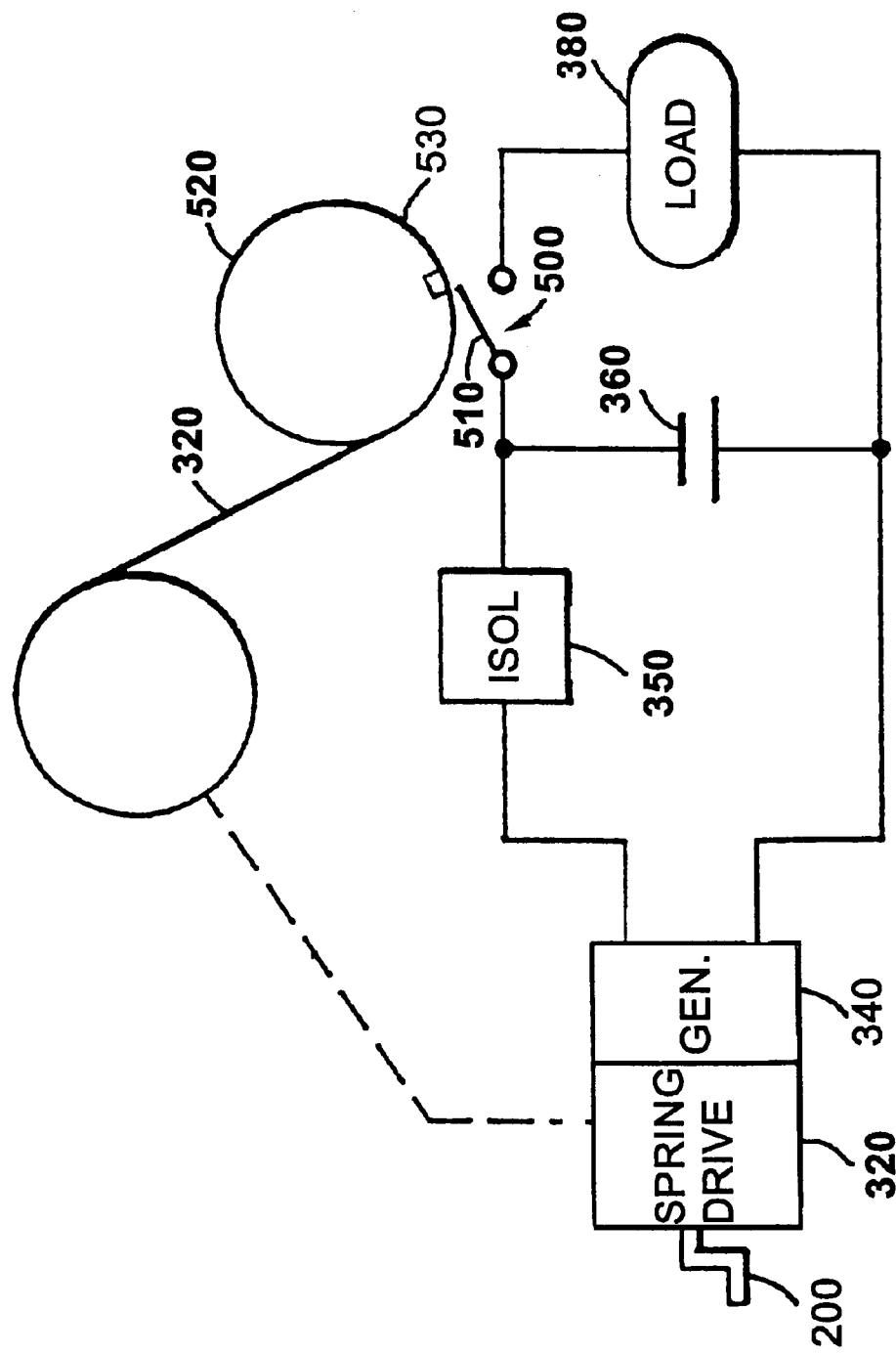
FIG. 13 is a block diagram of one embodiment of a disconnector used in conjunction with a manually powered apparatus.

In one embodiment as shown in FIG. 3, the disconnector 370 is mechanically coupled via mechanical linkage 310 to the spring drive 320, and the disconnector 370 is electrically connected between the electrical energy storage device 360 and the load 380. In one embodiment, as shown in FIGS. 11–13, the disconnector 370 comprises a switch 500 such as a micro-switch. In this embodiment, the mechanical linkage 310 comprises a pawl 510 that is operatively positioned between switch 500 and spring drive 320. The pawl 510 operatively connects to spring drive 320 to prevent the spring drive 320 from unwinding past a predetermined point. For example, as shown in FIG. 11, when spring drive 320 is unwound, the pawl 510 is depressed into cavity 530 of the spring spool 520 to prevent further rotation of the spring spool 520. When the pawl 510 is in this position, the switch 500 is open. Therefore, the load 380 is disconnected from the electrical energy storage device 360. As shown in FIG. 12, when the spring drive 320 is in the wound position, the pawl 510 is displaced out of the cavity 530. When the pawl 510 is out of the cavity 530, the switch 500 is closed. Therefore, the load 380 is connected to the electrical energy storage device 360.

In this embodiment, as shown in FIG. 13, the switch 500 is integral with spring drive 320. In this aspect, the pawl 510 and spring drive 320 comprise electrically conductive material. The switch 500 is electrically coupled between electrical energy storage device 360 and load 380. In this arrangement, the pawl 510 and spring drive 320 operate the switch 500. In addition, the switch 500 is closed during the period when spring drive 32 is unwinding, and the switch 500 opens when spring drive 320 is unwound and pawl 510 is depressed with cavity 530.

Figure 14:
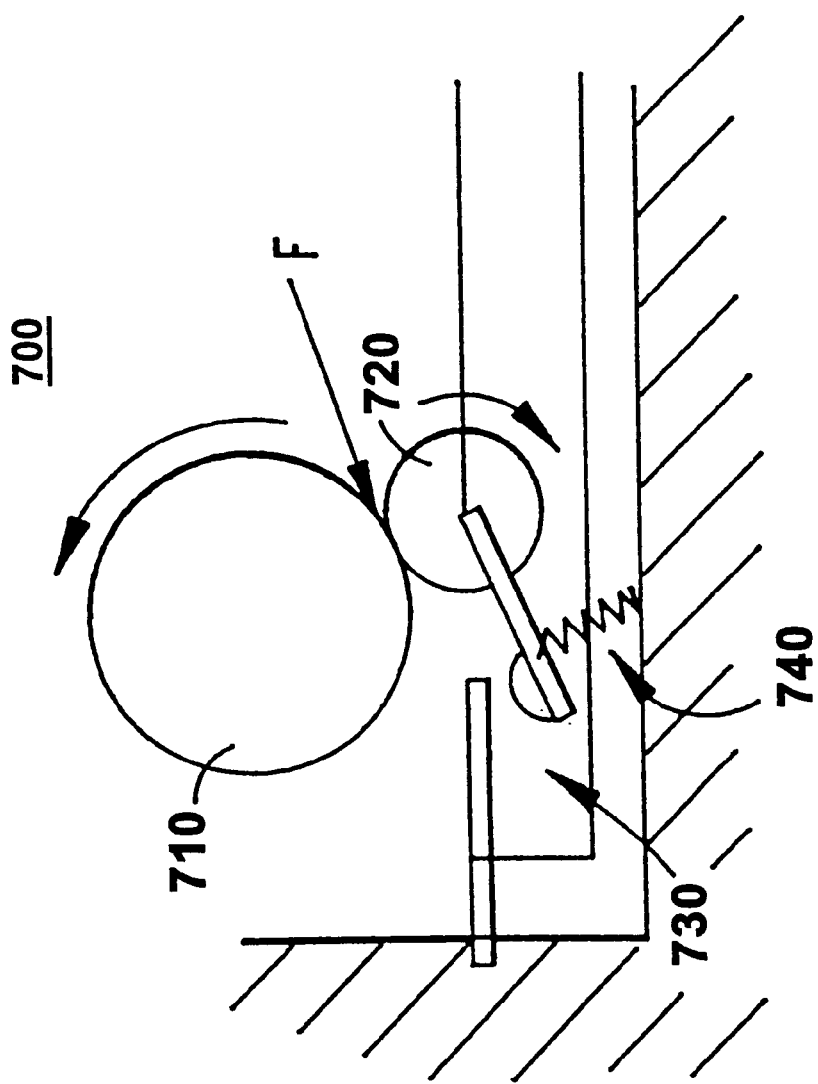
FIG. 14 is a side view of another embodiment of a disconnector used in conjunction with a manually powered apparatus.

In another embodiment, as shown in FIG. 14, the disconnector 370 comprises a crank clutch assembly 700. Crank clutch assembly 700 operates as a slip clutch to close a switch 730 when sufficient torque (F) is generated between a generator shaft 710 and a drive bearing 720. The torque is used to bias the switch 730 to the closed position. The switch 730 correspondingly opens when there is insufficient torque (F) between generator shaft 710 and drive bearing 720.

The spring drive 320 is mechanically coupled to generator shaft 710. As spring drive 320 unwinds, torque F is generated to cause switch 730 to close. Therefore, the electrical energy storage device 360 is coupled to the load 380. After spring drive 320 discharges a predetermined amount of mechanical energy, the torque F is reduced that enables a clutch spring 740 to pull switch 730 to the open position. Therefore, the electrical energy storage device 360 is disconnected from the load 380. As such, in this embodiment, the disconnector 370 couples electrical energy storage device 360 to the load 380 only while the spring drive 320 unwinds with sufficient torque (F).

In even another embodiment, the disconnector 370 is electrically coupled to and between the electrical energy storage device 360 and the load 380. In this embodiment, the disconnector 370 comprises an electrical circuit to prevent the electrical energy storage device 360 from completely discharging. The disconnector 370 senses the output voltage of the electrical energy storage device 360. When the output voltage falls below a predetermined voltage level, the disconnector disconnects the electrical energy storage device 360 from the load 380 to prevent the electrical energy storage device 360 from completely discharging.

As shown in FIG. 3, the load 380 is connected to the generator 340 via an isolator 350, a electrical energy storage device 360 and a disconnector 370. The load 380 can comprise various electrical or electronic devices. The load 380 can comprise devices such as toys, lights, electronic remote control devices, wireless electronic remote control devices and other electronic devices. It should be appreciated that the load 380 is not limited to electrical or electronic loads, and that mechanical loads are also encompassed.

Figure 15:
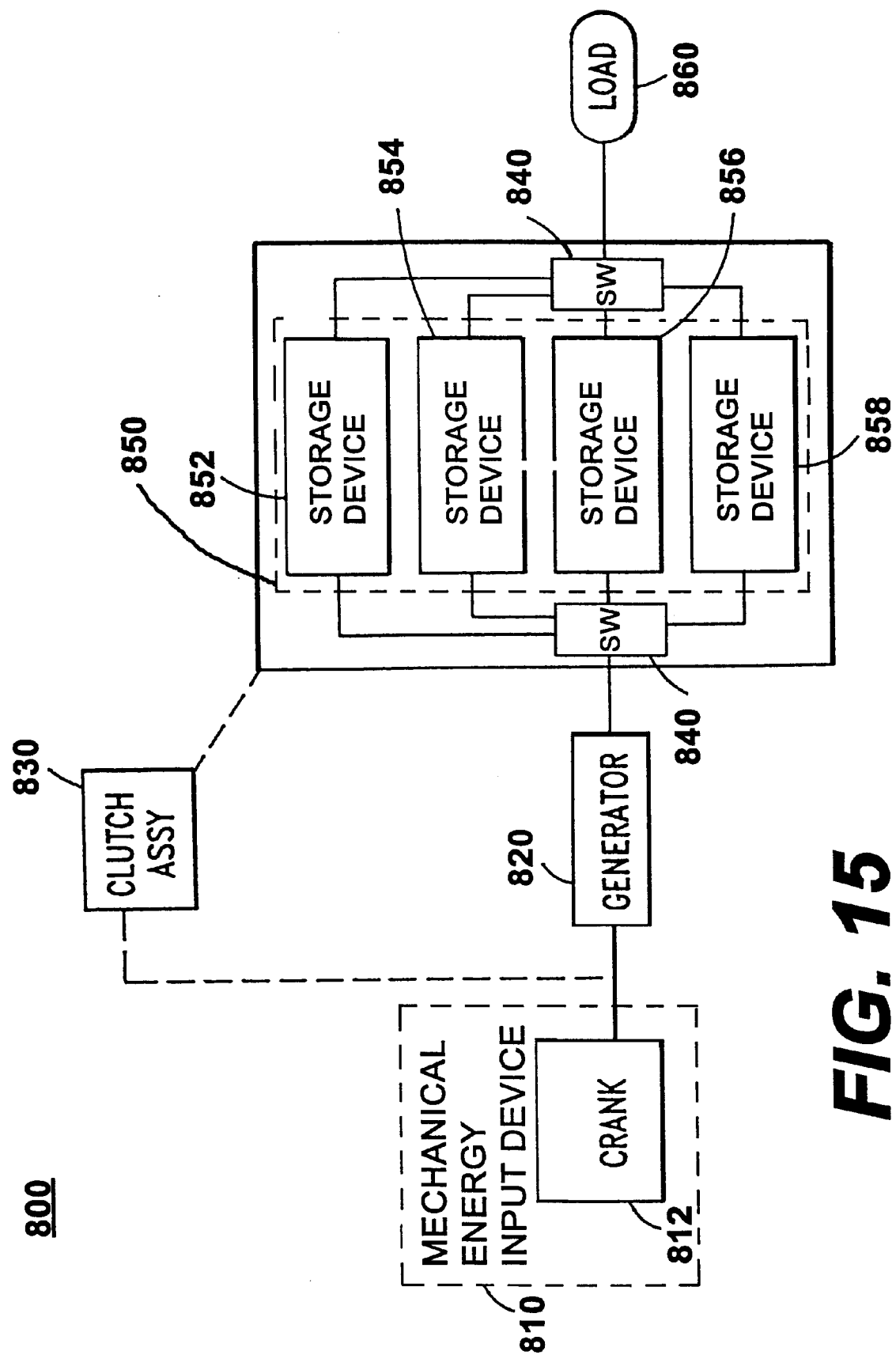
FIG. 15 is a schematic diagram of a slip clutch embodiment.

As shown in FIG. 15, another embodiment includes slip clutch circuit 800. The slip clutch circuit 800 includes a mechanical energy input device 810. In one embodiment, the mechanical energy input device 810 includes a crank 812. An electrical generator 820 is mechanically connected to the mechanical energy input device 810. An electrical load 860 is electrically connected to the generator 820.

A switching network 840 electrically connects an electrical energy storage device 850 to and between the electrical generator 820 and the electrical load 860. In one embodiment, the electrical energy storage device 850 includes electrochemical cells 852–858. The configuration of the slip clutch circuit 800 allows the electrical energy storage device 850 to be charged in series when mechanical energy is input via the mechanical energy input device 810. In addition, when mechanical energy is not input the electrical energy storage device 850 is connected in parallel for discharge to the load 860. Such a configuration allows a quicker charge time for the electrical energy storage device 850 and a longer play time for the electrical load 860.

Figure 16:
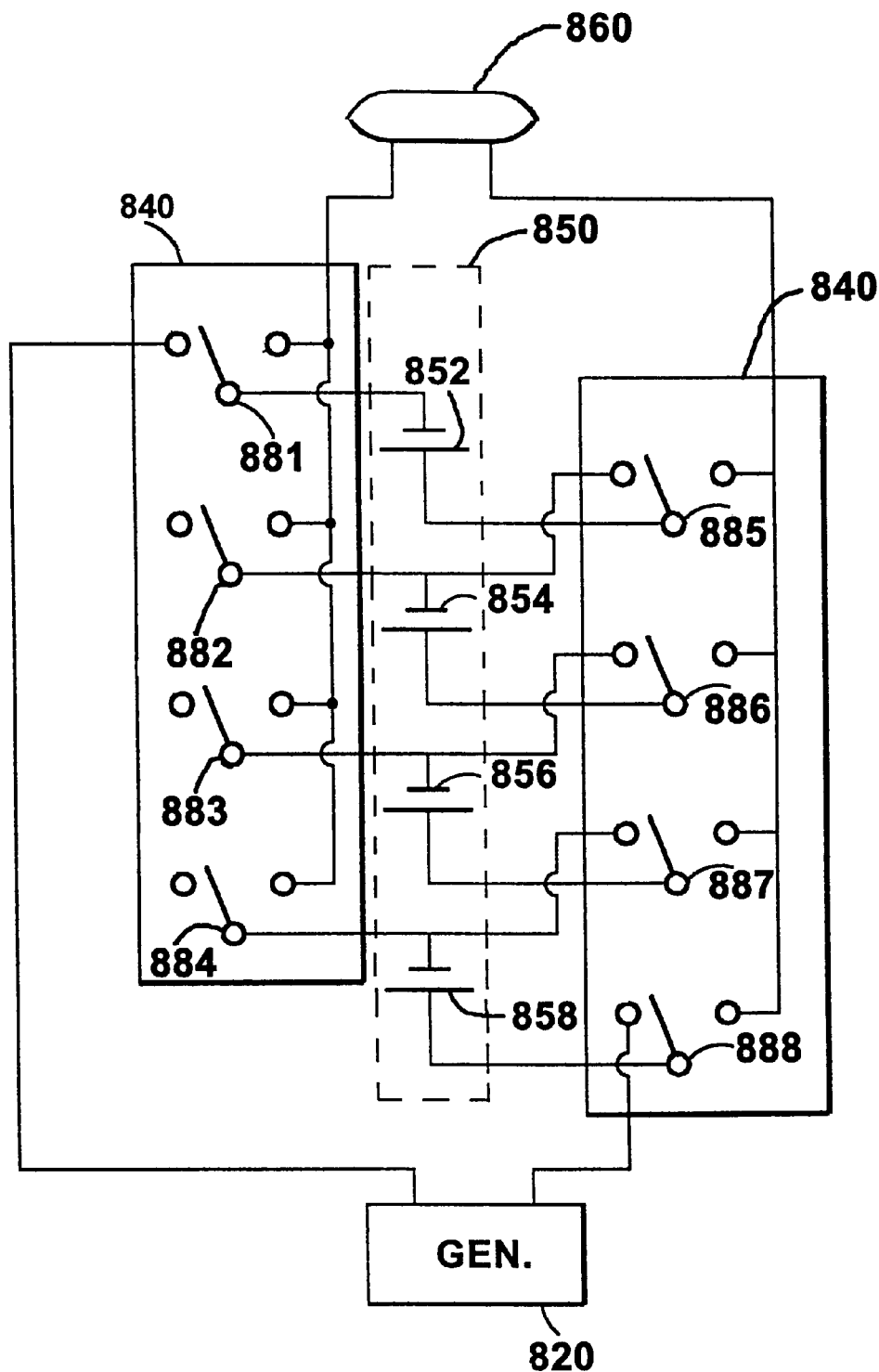
FIG. 16 is a schematic diagram of one embodiment of the switching network in the slip clutch embodiment.

In operation, the slip clutch circuit 800 connects the electrical energy storage device 850 via switching network 840 in series with the generator 820 when mechanical energy is input to the mechanical energy input device 810. When mechanical energy ceases to be input, the switching network 840 connects the electrical energy storage device 850 in parallel to the electrical load 860. In one embodiment as illustrated in FIG. 16, the switching network 840 comprises electronic switches 881–888 that change state corresponding to the mechanical energy input via the mechanical energy input device 810. In a preferred embodiment, the electronic switches 881–888 comprise single pole double throw (SPDT) switches. In another embodiment, the electronic switches 881–888 of the switching network 840 comprise a plurality of transistors such as MOSFETs or JFETs.

Figure 17:
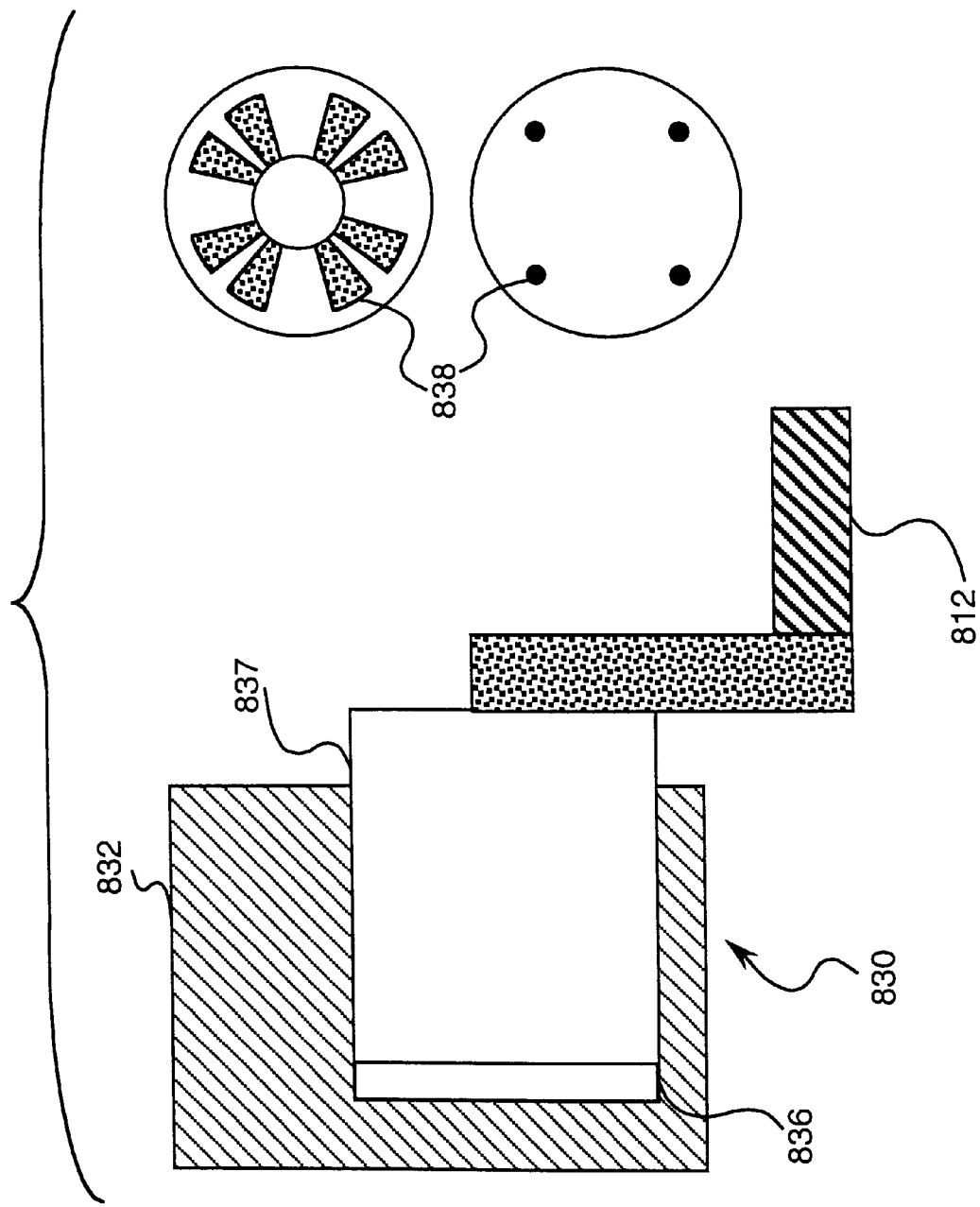
FIG. 17 is a side view of a slip clutch switch assembly.

In another embodiment, the mechanical energy input device 810 and the switching network 840 comprise a slip clutch switch assembly 830. As shown in FIG. 17, the slip clutch switching assembly 830 includes a crank 812 connected to a slip clutch 837 that is enclosed in generator housing 832. A set of sliding contacts 838 are provided at an interface region 836 of the slip clutch 837 and the generator housing 832. The slip clutch switch assembly 830 is controlled by the application of torque to crank 812.

The manually powered apparatus 100 (FIGS. 1–3) usually requires two hands to perform the winding operation. One hand operates a crank 812 applying torque while the other hand holds the manually powered apparatus 100 in a stationary position. In this embodiment, the hands are placed at opposite ends of slip clutch assembly 830 and interface region 836. This placement permits a limited amount of relative rotation between sliding switch contacts 838 due to slip clutch 837. A spring (not shown) causes this relative rotation to be stationary at a load contact position at all times except when slip clutch assembly 830 is being operated by the application of torque at crank 812. When sufficient torque is applied to overcome friction and spring loading, the sliding switch contacts 838 rotate to a generator contact position.

The sliding switch contacts 838, as shown in FIG. 17, perform a similar function to the switching network 840, as shown in FIG. 15. When sliding switch contacts 838 are disposed at the generator position, electrochemical cells 852–858 are configured to be coupled in series to electrical generator 820. When sliding switch contacts 838 are disposed at the load position, electrochemical cells 852–858 are configured to be coupled in parallel to electrical load 860. In even another embodiment, when sliding switch contacts 838 are at the load position, electro-chemical cells 852–858 are configured so that they are coupled in a series and a parallel configuration to load 860.

In FIGS. 15–16, four electrochemical cells 852–858 are shown. However, it should be appreciated that in other embodiments ten to twenty electro-chemical cells 852–858 may be employed so that the charging current can be reduced such that resistive losses are not dominant. Resistive losses are reduced by a factor in a range from about 6 to about 12 with ten to twenty electrochemical cells 852–858.

It should be further appreciated that, as shown in FIGS. 15–17, the electrical load 860 can comprise, for example, a radio, a flashlight and a power source for a rechargeable battery. Although FIGS. 15–17 show an exemplary switch arrangement where electro-chemical cells 852–858 are in coupled series for charging and electro-chemical cells 852–858 are coupled in parallel for load operation, the electrical load configuration can be varied to accommodate the particular needs of the desired electrical load 860. For example, if the electrical load 860 requires a greater power utilization, electro-chemical cells 852–858 can be connected in a combination series and parallel arrangement for load operation where groups of electro-chemical cells 852–858 are connected in parallel and other groups are connected in series.

Figure 18:
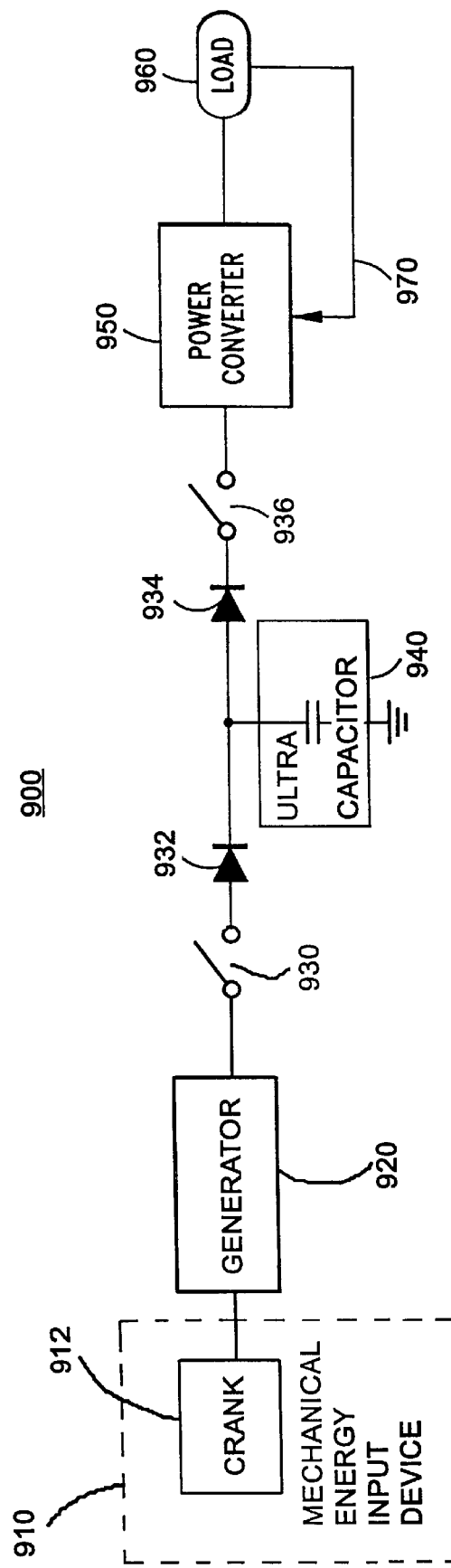
FIG. 18 is a schematic diagram of an ultracapacitor embodiment.

As shown in FIG. 18, an ultracapacitor circuit 900 uses an ultracapacitor 940 to supply power to electrical load 960. In this embodiment, a mechanical energy input device 910 is directly coupled to a generator 920. In one embodiment, the mechanical energy input device 910 includes a crank 912. In other embodiments, the mechanical energy input device 910 comprises, for example, a ratchet crank and a foot crank. The direct coupling allows the mechanical energy supplied to the generator 920 to directly produce a charge voltage. It should be appreciated that the charge voltage is proportional to the mechanical energy that is input to the generator from the crank 912.

The generator 920 is connected to the ultracapacitor 940. A generator switch 930 and an isolator 932 are connected between the generator 920 and the ultracapacitor 940. The isolator 932 prevents back current flow from the ultracapacitor 940 to the generator 920. The ultracapacitor 940 is connected to a power converter 950. A load switch 936 and an isolator 934 are connected between the ultracapacitor 940 and the power converter 950. The isolator 934 prevents back current flow from the power converter 950 to the ultracapacitor 940 and/or the generator 920. In one embodiment, the isolators 932 and 934 comprise diodes. The power converter 950 is connected to load 960, and an optional feedback loop 970 connects the load 960 to the power converter 950.

In operation, the generator 920 produces a charge voltage that is proportional to the mechanical energy input from the mechanical energy input device 912. The charge voltage must reach a minimum charge voltage level to be stored as electrical energy in the ultracapacitor 940. The electrical energy stored in the ultracapacitor in follows the equation $$E = \frac{1}{2}CV^2$$

where C is the capacitance in farads and V is the charge voltage in volts. In one embodiment, the minimum charge voltage is about 5.5 volts. It should be appreciated that generator switch 930 must be closed during charging the ultracapacitor 940.

Once charged, the ultracapacitor 940 supplies a first voltage to the power converter 950. It should be appreciated that the load switch 936 must be closed for the ultracapacitor 940 to supply the first voltage to the power converter 950. The power converter 950 converts the first voltage into an operational voltage for the load 960. In one embodiment, the power converter 960 can maintain the operational voltage on the load 960 so long as the charge voltage has a magnitude that is at least the same as or greater than the minimum charge voltage.

Since the energy in a charge stored by ultracapacitor 940 is generally proportional to the voltage, power converter 950 is employed to supply charge from ultracapacitor 940 to load 960. In one embodiment, the power converter 950 can be coupled to a varying input voltage (first voltage) and can generate a constant voltage or controlled voltage (operational voltage) to load 950. In another embodiment, the power converter 950 can be operated with a variable duty cycle pulse train. In a preferred embodiment, the power converter 950 converts a 120 volt, direct current (DC) level to a 2 volt DC level at a conversion efficiency over 90 percent. As shown in FIG. 18, an optional feedback loop 970 connects the load 960 to the power converter 950. The optional feedback loop 970 provides a control system for the ultracapacitor circuit 900.

Ultracapacitor 940 is used in this disclosure to describe a class of capacitors that have several designations in the art such as super capacitor, electrochemical capacitor, and electrochemical double layer capacitor. It should be appreciated that the ultracapacitor 940 can comprise, for example, any of the following: (1) a general classification of electric double layer capacitive energy storage devices which store energy by electro-absorption type chemical reactions; (2) capacitors that can store energy by reduction oxidation type chemical reactions; and (3) faradic pseudo capacitors. It should also be appreciated that the use of an ultracapacitor 940 provides an energy storage for a wide range of appliances and/or electronics, and the ultracapacitor 940 stores energy with less weight less bulk than a mechanical spring drive. In one embodiment, an ultracapacitor 940 provides several orders of magnitude higher storage density than mechanical spring drives.

Figure 19:
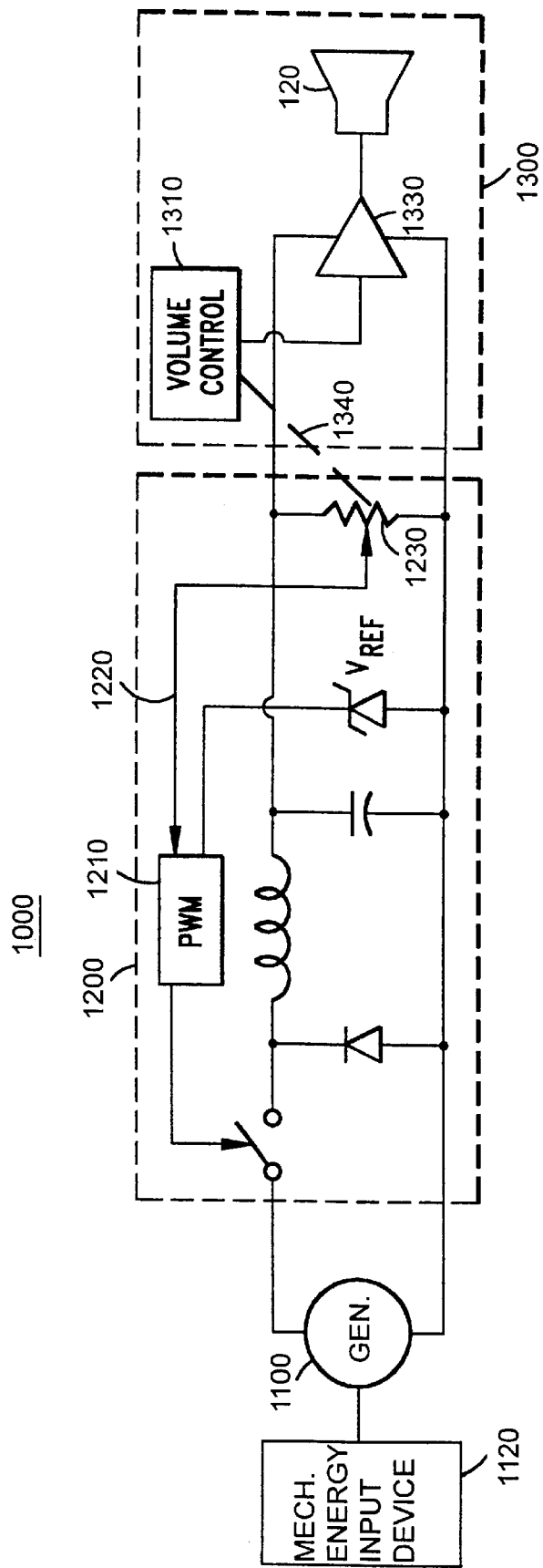
FIG. 19 is a schematic diagram of a control circuit.

In FIG. 19, a control circuit 1000 is included in the manually powered apparatus 100 (FIG. 1). The control circuit 1000 provides power management in the manually powered apparatus 100 to maximize the operational efficiency by controlling the voltage to load 1300. As the volume level is varied, the energy demand at load 1300 changes and causes a corresponding change in the load demand at generator 1100. It thus follows that a reduction in volume level causes a reduction in the mechanical energy required by the generator 1100 because of the reduced voltage demand by the load 1300.

Typically, generator 1100 operates at a varying output voltages depending on the torque supplied to the generator 1100 by mechanical energy input device 1120. The generator 1100 can be driven to deliver a wide range of load voltages by varying the mechanical energy input by the mechanical energy input device 1120. As the energy requirement for load 1300 is reduced, the corresponding voltage demand at generator 1100 is reduced, resulting in a reduction in the mechanical energy required by the generator 1100. Thus, the time for the generator 1100 to exhaust the mechanical energy stored in the mechanical energy input device 1120 varies inversely with the voltage demand of load 1300. The control circuit 1000, shown in FIG. 19, regulates the voltage supplied to the load 1300 so as to provide the minimum required voltage to the generator 1100 and therefore extend the energy recovery time from mechanical energy input device 1120.

As shown in FIG. 19, the control circuit 1000 includes a switching converter 1200 that provides a variable supply voltage to the electrical load 1300. The control circuit 1000 further includes a volume control 1310 that is connected to potentiometer 1230 via mechanical linkage 1340. From the potentiometer 1230, a feedback loop 1220 connects to a pulse width modulator 1210. The volume control 1310 is also connected to an amplifier 1330 and a speaker 120.

In the embodiment shown in FIG. 19, the control circuit 1000 responds to the volume control setting of the volume control 1310. The mechanical linkage 1340 establishes the voltage demand level that is sensed by switching converter 1200 through potentiometer 1230. The voltage demand level corresponds with a desired volume setting. In response to the volume control setting supplied via the potentiometer 1230 and feedback loop, the pulse width modulator 1210 changes the duty cycle and correspondingly the changes the voltage level supplied to the load 1300. The control circuit 1000 allows the generation of the minimum required voltage at each setting of the volume control 1310. The switching converter 1200 then regulates the voltage level supplied to the load 1300 so as to maintain the predetermined voltage demand level. In this manner the lowest voltage level is always supplied to the load 1300, and the operation time of the manually powered apparatus 100 (FIG. 1) is maximized from the stored mechanical energy in the mechanical energy input device 1120.

It should be appreciated that the control circuit 1000 can be included with any of the embodiments described herein. In addition, the control circuit 1000 disclosed in FIG. 19 uses the volume control setting to determine the power required by the load 1300, and the present invention encompasses other embodiments that use inputs other than volume to determine the power required by the load 1300.

The foregoing discussion of the invention has been presented for purposes of illustration and description. Further, the description is not intended to limit the invention to the form disclosed herein. Consequently, variations and modifications commensurate with the above teachings, with the skill and knowledge of the relevant art, are within the scope of the present invention. The embodiment described herein above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A manually powered apparatus for converting mechanical energy to electrical energy comprising:
    a crank;
    a spring drive mechanically coupled to said crank for releasing mechanical energy, wherein said spring drive has first and second unwind cycles;
    an electrical generator mechanically coupled to said spring drive for converting mechanical energy released by said spring drive into electrical energy, said electrical energy including at least first current levels and second current levels, said first and second current levels decreasing over time, said electrical generator supplying said first current levels in response to said first unwind cycle of said spring drive and supplying said second current levels in response to said second unwind cycle of said spring drive;
    an electrical load electrically coupled to said electrical generator, said electrical load requiring a predetermined current for operation, said first current levels being greater than said predetermined current and said second current levels being less than said predetermined current;
    a battery buffer electrically coupled between said electrical generator and said electrical load, said battery buffer being charged during said first unwind cycle of said spring drive, said battery buffer being discharged during said second unwind cycle of said spring drive;
    an isolator electrically coupled between said battery buffer and said electrical generator, said isolator minimizing reverse current flow from said battery buffer to said electrical generator; and
    a disconnector mechanically coupled to said spring drive and electrically coupled between said electrical load and said battery buffer, said disconnector decoupling said electrical load from said battery buffer when an unwinding of said spring drive is substantially completed.

2. The apparatus of claim 1 wherein said isolator further comprises:
    a transistor having an emitter, a collector, and a base, said emitter being coupled to a negative terminal of said electrical generator;
    said collector of said transistor being coupled to said electric load such that collector current is substantially equal to emitter current and such that reverse bias current of said transistor is at least two orders of magnitude lower than the collector current; and
    said base of said transistor being coupled to a base voltage to forward bias said transistor when said generator generates at least a predetermined voltage level.

3. The apparatus of claim 1 wherein said disconnector further comprises:
    a pawl operationally coupled to said spring drive, said pawl being disposed in a first position during an unwinding of said spring drive, and said pawl being disposed in a second position when said unwinding of said spring drive is completed; and
    a first mechanical switch electrically coupled between said electrical load and said battery buffer, said first mechanical switch being mechanically biased against said pawl, said first mechanical switch having a closed circuit condition when said pawl is in the first position and having an open circuit condition when said pawl is in the second position.

4. The apparatus of claim 1 wherein said crank comprises a ratchet crank.

5. The apparatus of claim 1 wherein said crank comprises a foot crank.

6. The apparatus of claim 1 wherein said crank comprises a doll part.

7. The apparatus of claim 1 wherein said crank comprises a wheel.

8. The apparatus of claim 1 wherein said disconnector further comprises:
    a drive bearing in frictional contact with said spring drive; and a second mechanical switch having contacts mechanically biased in a normally open circuit condition and operatively connected to a drive bearing, the normally open contacts of said second mechanical switch reverting to a closed circuit condition during a release of said mechanical energy from said spring drive.

9. The apparatus of claim 1 further comprising:
a control circuit connected to said electrical generator and said electrical load, said control circuit controlling voltage output by said electrical generator based on power required by said electrical load.

10. A manually powered apparatus for efficiently converting mechanical energy to electrical energy comprising:
a mechanical energy input device for releasing mechanical energy, said mechanical energy input device having at least first and second mechanical energy delivery cycles;
a generator mechanically coupled to said mechanical energy input device for converting mechanical energy released by said mechanical energy input device to electrical energy, said electrical energy including at least first current levels and second current levels, said first and second current levels decreasing over time, said generator supplying said first current levels in response to said first mechanical energy delivery cycle of said mechanical energy input device, and said generator supplying said second current levels in response to said second mechanical energy delivery cycle;
a load connected to said generator, said load requiring a predetermined current for operation, said first current levels being greater than said predetermined current and said second current levels being less than said predetermined current;
an electrical energy storage device connected between said generator and said load, said electrical energy storage device being charged during said first mechanical energy delivery cycle, and said electrical energy storage device being discharged during said second mechanical energy delivery cycle;
an isolator connected between said electrical energy storage device and said load, said isolator minimizing reverse current flow from said electrical energy storage device to said generator; and
a disconnector electrically connected between said electrical energy storage device and said load, said disconnector decoupling said load from said electrical energy storage device when an output voltage of said electrical energy storage device reaches a predetermined voltage level.

11. The apparatus of claim 10 further comprising:
a control circuit connected to said generator and said load, said control circuit controlling voltage output by said generator based on power required by said load.

12. The apparatus of claim 10 wherein said manually powered apparatus comprises a doll.

13. The apparatus of claim 12 wherein said mechanical energy input device comprises a doll part.

14. The apparatus of claim 10 wherein said mechanical energy input device comprises a wheel.

15. The apparatus claim 10 wherein said manually powered apparatus comprises a wireless electronic remote control.

16. A manually powered apparatus for converting mechanical energy to electrical energy comprising:
a crank;
an electrical generator mechanically coupled to said crank;
an electrical load;
a plurality of electrochemical cells electrically interconnected to and between said electrical generator and said electrical load;
a switching network electrically coupled to said plurality of electrochemical cells, said electrical generator and said electrical load;
said switching network connecting said plurality of electrochemical cells in series to said electrical generator when said crank generates a first torque to charge said plurality of electrochemical cells; and
said switching network connecting said plurality of electrochemical cells in parallel to said electrical load when said crank produces a second torque that is less than said first torque.

17. The apparatus of claim 16 wherein said switching network comprises a plurality of single-pole-double-throw (SPDT) switches.

18. The apparatus of claim 16 wherein said switching network comprises a plurality of transistors.

19. The apparatus of claim 16 wherein said crank comprises a ratchet crank.

20. The apparatus of claim 16 wherein said crank comprises a foot crank.

21. The apparatus of claim 16 wherein said crank comprises a slip clutch switch assembly operable between a first state corresponding to said first torque to connect said plurality of electrochemical cells in series with said electrical generator and a second state corresponding to said second torque to connect said plurality of electrochemical cell in parallel with said electrical load.

22. The apparatus of claim 21 wherein said slip clutch switch assembly comprises said switching network.

23. The apparatus of claim 21 wherein said slip clutch switch assembly further comprises:
a slip clutch in frictional contact with said crank, said slip clutch being movable to a first contact position corresponding to said first torque wherein said plurality of electrochemical cells are connected in series to said electrical generator, and said slip clutch being movable to a second contact position corresponding to said second torque wherein said plurality of electrochemical cells are connected in parallel to said electrical load.

24. A manually powered apparatus for converting mechanical energy to electrical energy comprising:
a mechanical energy input device;
an electrical generator mechanically coupled to said mechanical energy input device;
an electrical load;
a electrical energy storage device electrically interconnected to and between said electrical generator and said electrical load; and
a switching network electrically coupled to said electrical energy storage device, said electrical generator and said electrical load;
said switching network connecting said electrical energy storage device in series to said electrical generator when said mechanical energy input generates mechanical energy to charge said electrical energy storage device; and
said switching network connecting said electrical energy storage device in parallel to said electrical load when said mechanical energy input device stops producing mechanical energy.

25. The apparatus of claim 24 wherein said electrical energy storage device comprises a plurality of electrochemical cells.

26. The apparatus of claim 24 wherein said mechanical energy input device and said switching network comprise a slip clutch switch assembly.

27. The apparatus claim 24 wherein said slip clutch switch assembly comprises:

a slip clutch movable to a first contact position corresponding to said first torque wherein said electrical energy storage device is connected in series to said electrical generator, said slip clutch being movable to a second contact position corresponding to said second torque wherein said electrical energy storage device is connected in parallel to said electrical load.

28. A manually operated apparatus for converting mechanical energy into electrical energy comprising:

a crank;

an electrical generator mechanically coupled to said crank, said electrical generator generating electrical energy at a charge voltage, said charge voltage being proportional to mechanical energy supplied by said crank;

an ultracapacitor electrically coupled to said electrical generator receiving and storing said electrical energy, said ultracapacitor supplying said electrical energy at a first voltage level;

an electrical load electrically coupled to said ultracapacitor; and a power converter electrically coupled to and between said ultracapacitor and said electrical load, said power converter converting said first voltage level from said ultracapacitor to an operational voltage level sufficient to power said electrical load, said first voltage level being at least said operational voltage level.

29. The apparatus of claim 28 further comprising:

a generator switch electrically coupled between said electrical generator and said ultracapacitor, said generator switch selectively coupling said electrical generator to said ultracapacitor when said charge voltage is supplied by said electrical generator.

30. The apparatus of claim 28 further comprising:

a load switch electrically coupled between said power converter and said ultracapacitor, said load switch selectively coupling said ultracapacitor to said power converter to power said electrical load.

31. The apparatus of claim 28 wherein said power converter maintains said operational voltage level to said electrical load so long as said charge voltage is at least a minimum charge voltage level.

32. The apparatus of claim 28 further comprising:

a generator isolator electrically coupled between said electrical generator and said ultracapacitor, said electrical generator isolator preventing back-current flow from said ultracapacitor to said electrical generator.

33. The apparatus of claim 32 wherein said generator isolator comprises a diode.

34. The apparatus of claim 27 further comprising:

a load isolator electrically coupled between said power converter and said ultracapacitor, said load isolator preventing back-current flow from said power converter to said ultracapacitor.

35. The apparatus of claim 33 wherein said load isolator comprises a diode.

36. The apparatus of claim 28 wherein said crank comprises a ratchet crank.

37. The apparatus of claim 28 wherein said crank comprises a foot crank.

* * * * *